United States Patent
You et al.

(10) Patent No.: US 11,611,925 B2
(45) Date of Patent: Mar. 21, 2023

(54) SWITCHING PROCESSING METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Xin You, Dongguan (CN); Qianxi Lu, Dongguan (CN); Ning Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/168,141

(22) Filed: Feb. 4, 2021

(65) Prior Publication Data
US 2021/0160752 A1 May 27, 2021

Related U.S. Application Data

(63) Continuation of application No. PCT/CN2018/106203, filed on Sep. 18, 2018.

(51) Int. Cl.
H04W 36/30 (2009.01)
H04W 76/30 (2018.01)
(Continued)

(52) U.S. Cl.
CPC ......... *H04W 36/305* (2018.08); *H04W 36/08* (2013.01); *H04W 76/11* (2018.02); *H04W 76/27* (2018.02); *H04W 76/30* (2018.02)

(58) Field of Classification Search
CPC ... H04W 36/305; H04W 76/30; H04W 76/11; H04W 76/27; H04W 36/08;
(Continued)

(56) References Cited

U.S. PATENT DOCUMENTS 9,301,218 B1 3/2016 Sitaram et al.
10,856,201 B2 * 12/2020 Hong ................... H04W 76/27
(Continued)

FOREIGN PATENT DOCUMENTS

CA 2920995 A1 2/2015
CN 101207925 A 6/2008
(Continued)

OTHER PUBLICATIONS

62616785,Drawings-only_black_and_white_line_drawings,Jan. 12, 2018 (Year: 2018).*
(Continued)

*Primary Examiner* — Chi H Pham
*Assistant Examiner* — Ji-Hae Yea
(74) *Attorney, Agent, or Firm* — Bayes PLLC

(57) ABSTRACT

Disclosed herein are a switching processing method, a terminal device, a network device, a chip, a computer-readable storage medium, a computer program product, and a computer program. The method includes initiating a connection to a first target network device. The method also includes maintaining a connection with a source network device. when the connection with the first target network device fails, the method further includes returning to the connection with the source network device and initiating a connection to a second target network device.

20 Claims, 4 Drawing Sheets

---

Initiating a connection to a first target network device, and maintaining a connection with a source network device — 201

Returning to the connection with the source network device and initiating a connection to a second target network device, when the connection with the first target network device fails — 202

(51) Int. Cl.
*H04W 76/11* (2018.01)
*H04W 76/27* (2018.01)
*H04W 36/08* (2009.01)

(58) Field of Classification Search
CPC ............ H04W 36/0011; H04W 76/19; H04W 36/0079; H04W 36/0038; H04W 36/0055; H04W 36/0069; H04W 36/18; H04W 76/15
See application file for complete search history.

(56) References Cited

U.S. PATENT DOCUMENTS

| | | | |
|---|---|---|---|
| 2009/0280812 A1 | 11/2009 | Cheng et al. | |
| 2015/0319801 A1 | 11/2015 | Lee et al. | |
| 2016/0192269 A1 | 6/2016 | Kim et al. | |
| 2017/0026915 A1* | 1/2017 | Madan | H04W 52/244 |
| 2018/0227819 A1 | 8/2018 | Lee et al. | |
| 2019/0104452 A1* | 4/2019 | Park | H04L 5/0055 |
| 2019/0223073 A1* | 7/2019 | Chen | H04W 36/0079 |
| 2019/0246323 A1* | 8/2019 | Kim | H04W 36/305 |
| 2019/0253945 A1* | 8/2019 | Paladugu | H04W 12/033 |
| 2020/0022039 A1* | 1/2020 | Kadiri | H04W 36/08 |
| 2021/0168678 A1* | 6/2021 | Deenoo | H04W 36/00837 |

FOREIGN PATENT DOCUMENTS

| | | |
|---|---|---|
| CN | 101494884 A | 7/2009 |
| CN | 102804850 B | 6/2015 |
| CN | 106304220 A | 1/2017 |
| CN | 108093448 A | 5/2018 |
| JP | 2014039324 A | 2/2014 |
| TW | 201440549 A | 10/2014 |
| WO | 2017169229 A1 | 10/2017 |
| WO | 2020/056587 A1 | 3/2020 |

OTHER PUBLICATIONS

62616785,Specification,Jan. 12, 2018 (Year: 2018).*
62627208,Specification,Feb. 7, 2018 (Year: 2018).*
62631479,Specification,Feb. 15, 2018 (Year: 2018).*
62652163,Specification,Apr. 3, 2018 (Year: 2018).*
62696180,Specification,Jul. 10, 2018 (Year: 2018).*
Extended European Search Report issued in corresponding European Application No. 18934021.9, dated Oct. 8, 2021 10 pages.
"RLF analysis on make before break solution", Agenda item: 8.6.3, Source: ZTE Corporation, 3GPP TSG RAN WG2 Meeting #95bis, R2-166608, Kaohsiung, Oct. 10-14, 2016, 3 pages.
PCT Written Opinion of The International Searching Authority issued in corresponding International Application No. PCT/CN2018/106203, dated Jun. 18, 2019, 7 pages.
"3rd Generation Partnership Project; Technical Specification Group Radio Access Network; NR; NR and NG-RAN Overall Description; Stage 2 (Release 15)", 3GPP TS 38.300 V15.2.0 (Jun. 2018), 87 pages.
"3rd Generation Partnership Project; Technical Specification Group Radio Access Network; NR; Radio Resource Control (RRC) protocol specification (Release 15)", 3GPP TS 38.331 V15.2.0 (Jun. 2018), 304 pages.
"New WID: NR mobility enhancements", Source: Intel Corporation, Agenda Item: 9.1.10, 3GPP TSG RAN Meeting #80, RP-181433, La Jolla, USA, May 21-May 25, 2018, 5 pages.
First Office action issued in corresponding India Application No. 202117005162, dated Jan. 13, 2022, 6 pages.
First Office action issued in corresponding Chinese Application No. 202110368096.7, dated Jan. 21, 2022, 23 pages.
First Office Action issued in corresponding European application No. 18934021.9, dated Jun. 21, 2022.
Second Office Action issued in corresponding Chinese application No. 202110368096.7, dated Jul. 12, 2022.
First Office Action issued in corresponding Japanese application No. 2021-510375, dated Sep. 2, 2022.
Ericsson, "0 ms interruption support during handover procedure in NR", R2-1713402 (Resubmission of R2-1711141), 3GPP TSG-RAN WG2 #100 Reno, USA, Nov 27-Dec. 1, 2017.
Nokia et al., "Analysis of possible solutions for supporting URLLC requirements", R2-1700507(Re-submission of R2-168688), 3GPP TSG-RAN WG2 NR Adhoc Spokane, USA, Jan. 17-19, 2017.
First Office Action issued in corresponding Taiwanese application No. 108133678, dated Oct. 17, 2022.
Second Office Action issued in corresponding European application No. 18934021.9, dated Dec. 14, 2022.
First Office Action issued in corresponding Korean application No. 10-2021-7006664, dated Dec. 28, 2022.

* cited by examiner

SWITCHING PROCESSING METHOD, TERMINAL DEVICE AND NETWORK DEVICE

CROSS-REFERENCE TO RELATED APPLICATION

The present application is a continuation of International Application No. PCT/CN2018/106203, filed on Sep. 18, 2018, the contents of which are hereby incorporated by reference in its entirety.

BACKGROUND

The present disclosure relates to the field of information processing technologies, and in particular to a switching processing method, terminal device, network device, chip, computer-readable storage medium, computer program product, and computer program.

In mobile communication processing, handover may fail during a handover process. In general, reasons for handover failure are T304 timeout, T307 timeout, T312 timeout, etc. After the handover fails, re-initiating to switch LTE requires an initiation of a radio link failure (RLF) process.

SUMMARY

To solve the above technical problems, embodiments of the present disclosure provide a handover processing method, terminal device, network device, chip, computer-readable storage medium, computer program product, and computer program.

In a first aspect, the embodiments of the present disclosure provide a handover processing method, which is applied to a terminal device, and the method includes initiating a connection to a first target network device and maintaining a connection with a source network device; and returning to the connection with the source network device and initiating a connection to a second target network device, when the connection with the first target network device fails.

In a second aspect, the embodiments of the present disclosure provide a handover processing method, which is applied to a terminal device, and the method includes initiating a connection to a first target network device; and selecting a second target network device from at least one target network device and initiating a connection to the second target network device when the connection with the first target network device fails.

In a third aspect, the embodiments of the present disclosure provide a handover processing method, which is applied to a source network device, and the method includes maintaining a connection with a terminal device when the terminal device initiates a connection to a first target network device, and maintaining the connection with the terminal device when the terminal device fails to connect with the first target network device; wherein the terminal device is a terminal device located in a coverage area of the source network device.

In a fourth aspect, the embodiments of the present disclosure provide a handover processing method, which is applied to a terminal device, and the method includes disconnecting from a terminal device when the terminal device initiates a connection to a first target network device.

In a fifth aspect, the embodiments of the present disclosure provide a terminal device, including a first communication unit that initiates a connection to a first target network device, and maintains a connection with a source network device, and returns to the connection with the source network device and initiate a connection to a second target network device, when the connection with the first target network device fails.

In a sixth aspect, the embodiments of the present disclosure provide a terminal device, including a second communication unit that initiates a connection to a first target network device; and a second processing unit that selects a second target network device from at least one target network device and initiates a connection to the second target network device through the second communication unit, when the connection with the first target network device fails.

In a seventh aspect, the embodiments of the present disclosure provide a source network device, including a third communication unit that maintains a connection with a terminal device when the terminal device initiates a connection to a first target network device, and maintains the connection with the terminal device when the terminal device fails to connect with the first target network device, wherein the terminal device is a terminal device located in a coverage area of the source network device.

In an eighth aspect, the embodiments of the present disclosure provide a source network device, including a fourth communication unit that disconnects from a terminal device when the terminal device initiates a connection to a first target network device.

In a ninth aspect, the embodiments of the present disclosure provide a terminal device, including a processor and a memory. The memory is configured to store a computer program, and the processor is configured to call and run the computer program stored in the memory to execute the method in the first aspect or any of the implementations thereof.

In a tenth aspect, there is provided a network device, including a processor and a memory. The memory is configured to store a computer program, and the processor is configured to call and run the computer program stored in the memory to execute the method in the second aspect or any of the implementations thereof.

In an eleventh aspect, there is provided a chip configured to perform the method in any one of the first to second aspects or any of the implementations thereof.

Specifically, the chip includes a processor, configured to call and run a computer program from a memory, so that a device installed with the chip performs the method in any one of the first to second aspects or any of the implementations thereof.

In a twelfth aspect, there is provided a computer-readable storage medium, configured to store a computer program that causes a computer to perform the method in any one of the first to second aspects or any of the implementations thereof.

In a thirteenth aspect, there is provided a computer program product, including computer program instructions, which cause the computer to perform the method in any one of the first to second aspects or any of the implementations thereof.

In a fourteenth aspect, there is provided a computer program which, when run on a computer, causes the computer to perform the method in any one of the first to second aspects or any of the implementations thereof.

DETAILED DESCRIPTION

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions according to the embodiments of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Figure 1:
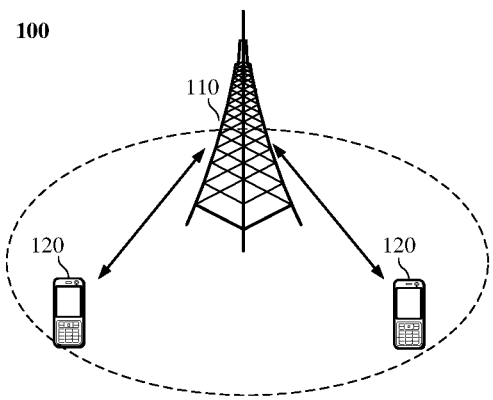
FIG. 1 is a first schematic diagram of a communication system architecture provided by an embodiment of the present disclosure.

Exemplarily, a communication system 100 applied in an embodiment of the present disclosure may be shown in FIG. 1. The communication system 100 may include a network device 110. The network device 110 may be a device communicating with user equipment (UE) 120 (or referred to as a communication terminal or a terminal). The network device 110 may provide communication coverage to a specific geographic region and may communicate with UE located within the coverage region. Optionally, the network device 110 may be a base transceiver station (BTS) in a global system for mobile communications (GSM) or a code division multiple access (CDMA) system, or a nodeB (NB) in a wideband code division multiple access (WCDMA) system, or an evolutional node B (eNB or eNodeB) in a long term evolution (LTE) system, or a radio controller in a cloud radio access network (CRAN). Or, the network device may be a mobile switching center, a relay station, an access point, a vehicle device, a wearable device, a concentrator, a switchboard, a network bridge, a router, a network-side device in a 5th generation (5G) network, or a network device in a public land mobile network (PLMN) that will be evolved in the future, and the like.

The communication system 100 further includes at least one UE 120 located within a coverage range of the network device 110. The "UE" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another UE, which is configured to receive/transmit a communication signal; and/or an Internet of things (IoT) device. The UE configured to realize communication through a wireless interface may be referred to as a "wireless communication terminal," a "wireless terminal," or a "mobile terminal." Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The UE may refer to an access terminal, a user equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device, or other processing devices connected to a radio modem, a vehicle device, a wearable device, UE in a 5G network, or UE in the PLMN that will be evolved in the future, and the like.

Optionally, device to device (D2D) communication may be realized among the UE 120.

Optionally, a 5G system or 5G network may also be referred to as a new radio (NR) system or NR network.

FIG. 1 exemplarily illustrates one network device and two UEs. Optionally, the communication system 100 may include a plurality of network devices, and a coverage range of each network device may include other numbers of UEs, which is not limited by the embodiment of the present disclosure.

Optionally, the communication system 100 may also include other network entities such as a network controller and a mobile management entity, which is not limited by the embodiment of the present disclosure.

It should be understood that a device having a communication function in a network/system in the embodiment of the present disclosure may be referred to as a communication device. The communication system 100 shown in FIG. 1 is taken as an example. The communication device may include a network device 110 and UE 120, which have communication functions. The network device 110 and the UE 120 may be the above-mentioned specific devices, and descriptions thereof are omitted here. The communication device may also include other devices in the communication system 100, such as other network entities including the network controller, the mobile management entity, and the like, which is not limited by the embodiment of the present disclosure.

It should be understood that the terms "system" and "network" herein may often be interchanged herein. The term "and/or" herein is only an association relationship that describes associated objects and represents that there may be three relationships. For example, A and/or B may represent that: A exists alone, A and B exist simultaneously, and B exists alone. In addition, the character "/" herein generally indicates that front and back associated objects are in an "or" relationship.

In order to understand the characteristics and technical content of the embodiments of the present disclosure in more detail, implementations of the embodiments of the present disclosure will be described in detail below with reference to the accompanying drawings. The attached drawings are for reference and explanation purposes only and are not intended to limit the embodiments of the present disclosure.

First Embodiment

Figure 2:
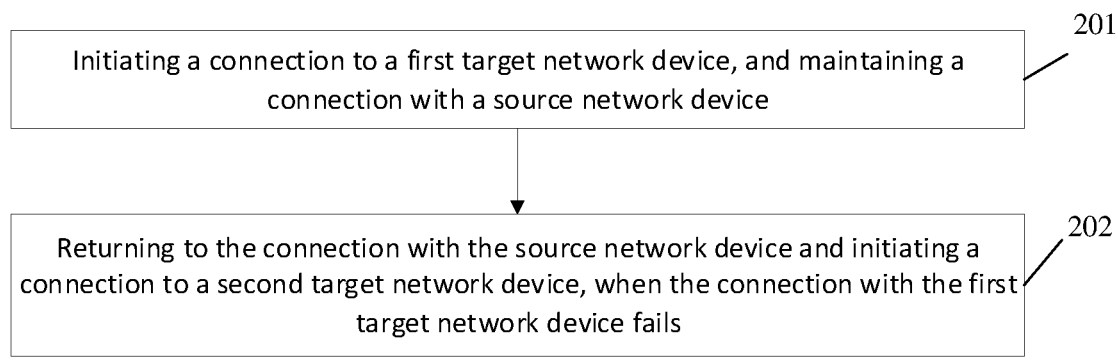
FIG. 2 is a first schematic flowchart of a handover processing method provided by an embodiment of the present disclosure.

An embodiment of the present disclosure provides a handover processing method, which is applied to a terminal device. As shown in FIG. 2, the method includes:

in step 201, a connection is initiated to a first target network device, and a connection with a source network device is maintained; and in step 202, when the connection with the first target network device fails, it is returned to the connection with the source network device, and a connection is initiated to a second target network device.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover of the terminal device to the target network device is performed. For example, it is executed after the terminal device has completed measurement according to control of the source network device and reported a measurement result to the source network device, and the source network device selects the target network device for the terminal device.

In the solution provided in this embodiment, the maintaining the connection with the source network device when the terminal device initiates a connection request to the first target network device, specifically includes: the terminal device retains a first protocol stack and a first related key with the source network device and performs maintenance on a second protocol stack and a second related key with the first target network device. The first related key is different from the second related key. The second related key may be generated by the first related key.

The first protocol stack and the second protocol stack may be the same or different, or at least partly different. For example, for a 5G system, it may be that different service data application protocols (SDAP), different packet data convergence protocols (PDCP), different radio link layer control (RLC) protocols, different media access control (MAC) entities, and different low layer entities are maintained between the terminal device and the source network device, and between the terminal device and the first target network device; for a 4G systems, it may be that different packet data convergence protocols (PDCP), different radio link layer control (RLC) protocols, different media access control (MAC) entities, and different low layer entities are maintained between the terminal device and the source network device, and between the terminal device and the first target network device.

In this embodiment, after the terminal device fails to connect with the first target network device, a process of re-establishing a connection with the second target network device may be performed, which specifically may be: re-initiating a connection to the second target network device based on a new target network device selected by the source network device.

At this time, the source network device re-initiates a handover preparation process, such as triggering the terminal device to perform the measurement, and the source network device requests to switch to the second target network device for the terminal device according to the measurement report. That is, the source network device can re-select the second target network device for the terminal device; the measurement report can be re-triggered by the source base station to cause the terminal to perform handover measurement and report the measurement result, etc., or a second target base station may be selected based on the measurement report previously reported by the terminal device.

Before initiating the connection to the second target network device, or after the terminal device fails to connect with the first target network device, the method further includes: sending second indication information to the source network device, and the second indication information is used for notifying that the connection with the first target network device fails.

In other words, before re-initiating the connection to a new target network device, that is, the second target network device, or after the terminal device fails to connect with the first target network device, the terminal device also needs to notify the source network device that the connection with the first target network device fails, so that the source network device performs subsequent processing.

In addition, this embodiment may also provide other processing manners. When the source network device can select multiple target network devices for the terminal device, it can send information of at least one target network device included for the terminal device by sending RRC connection reconfiguration information during the handover preparation to the handover processing stage.

A handover command from the source network device to the terminal device may include multiple optional reconfiguration messages of the target network device. Here, the reconfiguration message can be an RRC connection reconfiguration message. A method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

When the terminal device performs the step 201, it may select the first target network device from at least one target network device, then initiate the connection to the first target network device and maintain the connection with the source network device.

Furthermore, a process of re-establishing the connection with the new target network device may be selecting the second target network device from the at least one target network device and re-initiating a connection to the second target network device.

That is to say after the terminal device returns to the connection with the source network device, the source network device does not need to select the target network device again; instead, the terminal device selects the second target network device from the least one target network device included in the RRC connection reconfiguration information according to original received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

Figure 3:
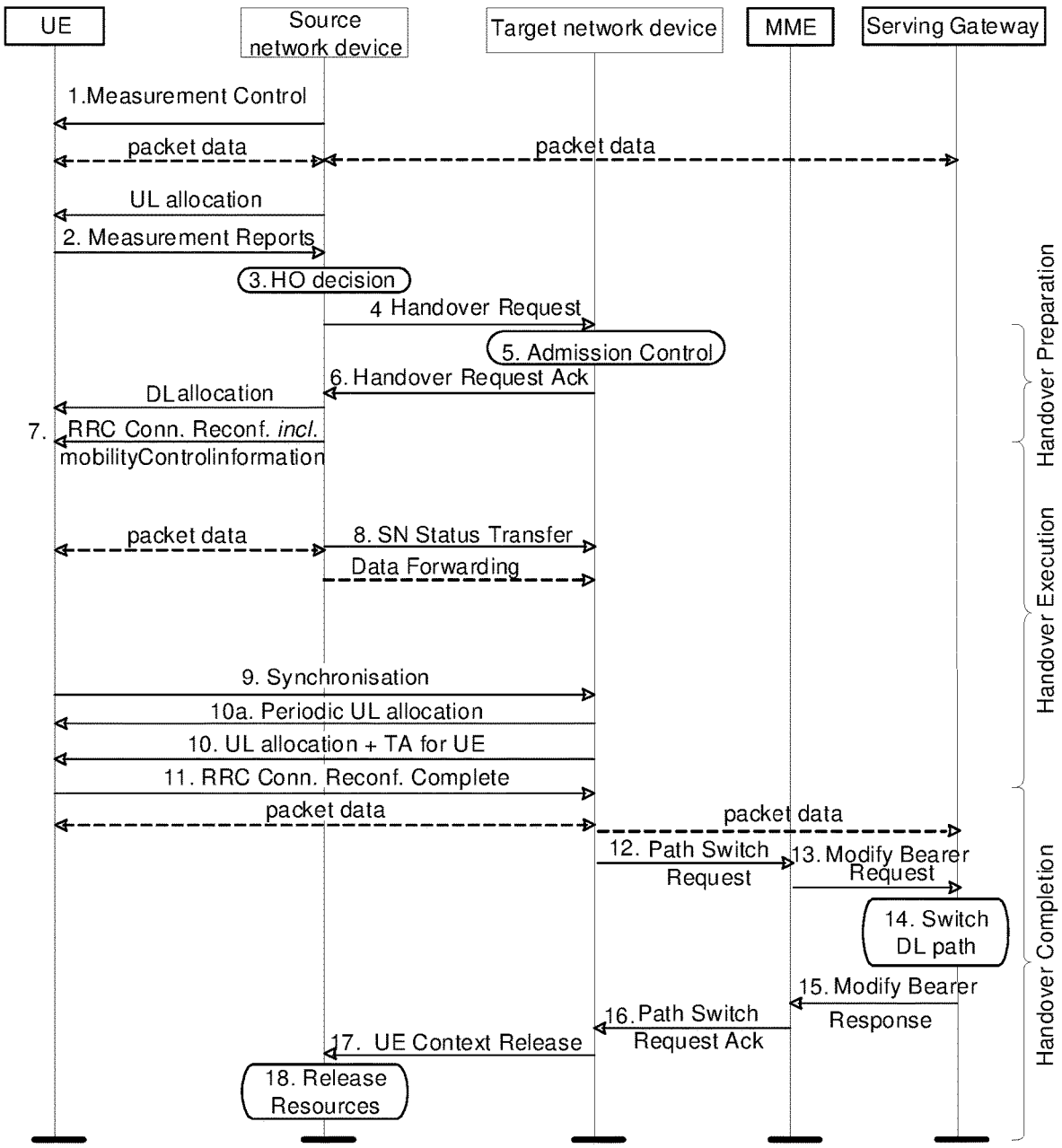
FIG. 3 is a schematic diagram of a handover processing scenario provided by an embodiment of the present disclosure.

A handover processing flow can be seen in FIG. 3, including a handover preparation phase includes steps 1-6 in the figure: the source network device sends measurement control to the terminal device; the terminal device sends a measurement report to the source network device after performing the measurement for multiple network devices or cells; the source network device makes a handover decision according to the measurement report (or along with RRM information); the source network device sends a handover request to the target network device, so that the target network device is ready for the handover; the target network device performs handover admission control according to the handover request; when the target network device determines to perform the handover, it sends a handover request acknowledgement to the network device. Then the flow proceeds to a handover execution phase, which includes steps 7-11 in the figure, specifically: the target network device generates RRC information, sends the RRC information to the source network device, and the source network device sends it to the terminal device through the RRC connection reconfiguration information; after receiving the RRC connection reconfiguration information, the terminal device performs the handover processing based on the connection reconfiguration information; then the source network device sends SN status transfer to the target network device; the terminal device synchronizes with the target network device, and then receives the target network device for UL allocation, and sends the RRC connection reconfiguration completion message to the target network device. Finally, the flow proceeds to a handover completion stage, which includes steps 12-18 in the figure, specifically: the target network device sends a path switching request to the MME to notify the MME terminal device to change the cell; the MME sends a bearer adjustment request to a serving gateway, and the MME performs a downlink path switching processing; after completing the processing, the serving gateway sends bearer adjustment completion processing to the MME, and the MME sends a path switching request acknowledgement message to the target network device; the target network device notifies the source network device of the terminal device context release and the source network device releases the resource.

Before initiating the connection to the second target network device, or after the terminal device fails to connect with the first target network device, the terminal device may also notify the source network device that the connection with the first target network device fails, so that the source network device performs the subsequent processing. Of course, in this scenario, the source network device may not be notified of the connection failure, and the terminal device only needs to directly select the second target network device from the multiple target network devices.

It should be understood that the second target network device may be the same as or different from the first target network device.

It should also be noted that when the connection is reinitiated to the second target network device, the method further includes: maintaining the connection with the source network device.

That is to say, during the process of initiating the connection with the first target network device and the second target network device by the terminal device, the connection with the source network device can be maintained.

After initiating the connection to the second target network device, the method further includes: sending first indication information to the source network device if the connection with the second target network device is successfully established, and the first indication information is used for indicating identification information of the second target network device selected from the at least one target network device.

That is, through the connection with the source network device, the indication information is sent to the source network device through the connection with the source network device, so that the source network device knows the second target network device selected by the terminal device. Correspondingly, the second target network device will perform handover subsequent operations according to the connection initiated by the terminal device, for example, synchronize with the target network device, then receive the second target network device for UL allocation, and send the RRC connection reconfiguration completion information to the target network device; the second target network device sends the path switching request to the MME to notify the MME terminal device to change the cell; the MME sends the bearer adjustment request to the serving gateway, and the MME performs the downlink path switching processing; the serving gateway sends the bearer adjustment completion processing to the MME after the processing is completed, and the MME sends the path switching request acknowledgement message to the second target network device; the second target network device notifies the source network device of the terminal device context release and the source network device releases the resource. It should be understood that the foregoing is only an example of the handover processing method in the LTE scenario. In LTE, a core network element is the MME, and this embodiment is not limited to the LTE scenario and can also be applied to a New Radio (NR) scenario. And in this case, the core network element is changed from MME to AMF and UPF, but this embodiment will not exhaustively list different scenarios.

For example, if the source network device wants the terminal device to perform the handover, it triggers the terminal device to perform the measurement and sends the handover request to multiple target network devices; when the terminal device receives RRC reconfiguration messages of the multiple target network devices and selects one of them as the first target network device to perform random access; when the terminal device is to switch from the source network device to the first target network device if T304 times out or access to the target network device fails, the terminal device can select the second target network device among the remaining at least one target network device configured in the RRC connection reconfiguration information in the HO command and perform the random access to the second target network device on the basis of maintaining the connection with the source network device. In this way, the terminal device can not only retain the connection with the source network device, but also can directly select the second target network device from the multiple target network devices to initiate the handover process when the handover to the first target network device fails, thereby ensuring zero latency for the handover processing.

Finally, it should be noted that the network device in this embodiment includes the source network device, the first target network device, and the second target network device, and may be a base station in the communication system, and of course, it can also be other devices. This embodiment will not be exhaustive.

The applicable scenarios of this embodiment are the terminal maintains the connection with the source network device and fails to connect with the target network device; the terminal disconnects from the source network device and successfully connects with the target network device, and the secondary cell group (SCG) fails to connect, and the SCG fails to change the connection. Of course, there may also be that in a scenario where multiple SCGs are configured, and one SCG fails to connect, and in a scenario where multiple target cells are configured, and one target cell fails to connect. There may also be other applicable scenarios, but it is not exhaustively listed in this embodiment.

It can be seen that with the above implementations, since the terminal device maintains the connection with the source network device during the handover phase, when the terminal device fails to switch the connection with the target network device, it still returns to the connection with the source network device, and re-initiates the connection to the new target network device; in this way, the terminal device can maintain the connection with the source network device when the handover fails, thereby ensuring that the connection with the target network device can be quickly re-established.

Second Embodiment

Figure 4:
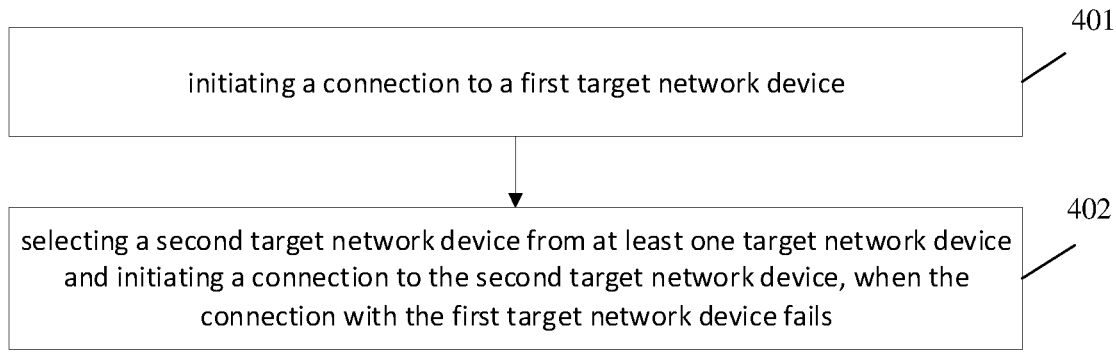
FIG. 4 is a second schematic flowchart of a handover processing method provided by an embodiment of the present disclosure.

An embodiment of the present disclosure provides a handover processing method, which is applied to a terminal device. As shown in FIG. 4, the method includes in step 401, a connection is initiated to a first target network device; and in step 402, when the connection with the first target network device fails, a second target network device is selected from at least one target network device, and a connection is initiated to the second target network device.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover between the terminal device and the target network device is performed. For example, it is executed after the terminal device has completed measurement according to control of the source network device and reported a measurement result to the source network device, and the source network device selects the target network device for the terminal device.

This embodiment is different from the first embodiment in that when the terminal device is connecting to the first target network device in this embodiment, it disconnects from the source network device.

This embodiment further includes receiving a reconfiguration message containing the at least one target network device sent by the source network device.

The reconfiguration message can be an RRC connection reconfiguration message. A method for obtaining the RRC connection reconfiguration information can be: when the source network device can select multiple target network devices for the terminal device, it can send information of at least one target network device included for the terminal device by sending RRC connection reconfiguration information during the handover preparation to the handover processing stage; and a method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

That is, when the terminal device fails to connect to the first target network device, the terminal device selects the second target network device from the at least one target network device contained in the RRC connection reconfiguration information according to the received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

A handover processing flow can be seen in FIG. 3, including a handover preparation phase includes steps 1-6 in the figure: the source network device sends measurement control to the terminal device; the terminal device sends a measurement report to the source network device after performing the measurement for multiple network devices or cells; the source network device makes a handover decision according to the measurement report (or along with RRM information); the source network device sends a handover request to the target network device, so that the target network device is ready for the handover; the target network device performs handover admission control according to the handover request; when the target network device determines to perform the handover, it sends a handover request acknowledgement to the network device. Then the flow proceeds to a handover execution phase, which includes steps 7-11 in the figure, specifically: the target network device generates RRC information, sends the RRC information to the source network device, and the source network device sends it to the terminal device through the RRC connection reconfiguration information; after receiving the RRC connection reconfiguration information, the terminal device performs the handover processing based on the connection reconfiguration information; then the source network device sends SN status transfer to the target network device; the terminal device synchronizes with the target network device, and then receives the target network device for UL allocation, and sends the RRC connection reconfiguration completion message to the target network device. Finally, the flow proceeds to a handover completion stage, which includes steps 12-18 in the figure, specifically: the target network device sends a path switching request to the MME to notify the MME terminal device to change the cell; the MME sends a bearer adjustment request to a serving gateway, and the MME performs a downlink path switching processing; after completing the processing, the serving gateway sends bearer adjustment completion processing to the MME, and the MME sends a path switching request acknowledgement message to the target network device; the target network device notifies the source network device of the terminal device context release and the source network device releases the resource.

The second target network device may perform the handover subsequent operations according to the connection initiated by the terminal device, for example, synchronize with the target network device, then receive the second target network device for UL allocation, and send the RRC connection reconfiguration completion information to the target network device; the second target network device sends the path switching request to the MME to notify the MME terminal device to change the cell; the MME sends the bearer adjustment request to the serving gateway, and the MME performs the downlink path switching processing; the serving gateway sends the bearer adjustment completion processing to the MME after the processing is completed, and the MME sends the path switching request acknowledgement message to the second target network device; the second target network device notifies the source network device of the terminal device context release and the source network device releases the resource. It should be understood that the foregoing is only an example of the handover processing method in the LTE scenario. In LTE, a core network element is the MME, and this embodiment is not limited to the LTE scenario and can also be applied to a New Radio (NR) scenario. And in this case, the core network element is changed from MME to AMF and UPF, but this embodiment will not exhaustively list different scenarios.

The first target network device and the second target network device are target network devices when the terminal device performs the handover, or the first target network device and the second target network device are secondary nodes SNs, and the source network device is the master node MN.

The applicable scenarios of this embodiment are in a scenario where multiple SCGs are configured, and one SCG fails to connect, and in a scenario where multiple target cells are configured, and one target cell fails to connect. There may also be other applicable scenarios, but it is not exhaustively listed in this embodiment.

For example, in a dual-connection (DC) or multi-connection scenario, the master node (MN) selects multiple secondary nodes (SN) according to the measurement results to initiate an SN addition request or an SN modification request; at this time, the terminal device can obtain information of at least one target SN. If the addition or change of a first target SN, that is, the first target network device fails, the terminal device can change to the second target SN, that is, the second target network device to perform the random access.

It can be seen that with the above implementations, since the terminal device can reselect the second target network device from the multiple target network devices to initiate the connection when the terminal device fails to switch the connection with the first target network device in the handover phase; in this way, the terminal device can quickly re-initiate the connection when the handover fails.

Third Embodiment

An embodiment of the present disclosure provides a handover processing method, which is applied to a source network device, and the method includes when the terminal device initiates a connection to a first target network device, a connection with a terminal device is maintained, and when the terminal device fails to connect with the first target network device, the connection with the terminal device is maintained, and the terminal device is a terminal device located in a coverage area of the source network device.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover between the terminal device and the target network device is performed. For example, it is executed after the terminal device has completed measurement according to control of the source network device and reported a measurement result to the source network device, and the source network device selects the target network device for the terminal device.

In the solution provided in this embodiment, the maintaining the connection with the source network device when the terminal device initiates a connection request to the first target network device, specifically includes: the terminal device retains a first protocol stack and a first related key with the source network device and performs maintenance on a second protocol stack and a second related key with the first target network device. The first related key is different from the second related key. The second related key may be generated by the first related key.

The first protocol stack and the second protocol stack may be the same or different, or at least partly different. For example, for a 5G system, it may be that different service data application protocols (SDAP), different packet data convergence protocols (PDCP), different radio link layer control (RLC) protocols, different media access control (MAC) entities, and different low layer entities are maintained between the terminal device and the source network device, and between the terminal device and the first target network device; for a 4G systems, it may be that different packet data convergence protocols (PDCP), different radio link layer control (RLC) protocols, different media access control (MAC) entities, and different low layer entities are maintained between the terminal device and the source network device, and between the terminal device and the first target network device.

In this embodiment, after the terminal device fails to connect with the first target network device, a process of re-establishing a connection with the second target network device may be performed.

At this time, the source network device re-initiates a handover preparation process, such as triggering the terminal device to perform measurement, and the source network device requests to switch to the second target network device for the terminal device according to the measurement report. That is, the source network device can re-select the second target network device for the terminal device; the measurement report can be re-triggered by the source base station to cause the terminal to perform handover measurement and report the measurement result, etc., or a second target base station may be selected based on the measurement report previously reported by the terminal device.

In this embodiment, the method for selecting the second target network device of the terminal device may also include one of the following: selecting the second target network device based on the measurement report corresponding to the at least one target network device; and randomly selecting the second target network device from the at least one target network device.

The source network device can directly obtain the measurement report of at least one target network device of the terminal device when the terminal device initiates the handover process of the first target network device. When the terminal device needs to initiate the connection again, the source network device can directly select the second target network device from the at least one target network device in the originally obtained measurement report, and indicate the second target network device to the terminal device, so that the terminal device can initiate the connection request to the second target network device; or, when the terminal device needs to initiate the connection to the second target network device, the network side directly selects the second target network device randomly from at least one target network device and initiates it to the terminal device.

Before maintaining the connection with the terminal device when the terminal device initiates the connection to the second target network device, or after the terminal device fails to connect with the first target network device, the method further includes receiving second indication information sent by the terminal device, wherein the second indication information is used for notifying that the terminal device fails to connect with the first target network device.

In other words, before re-initiating the connection to a new target network device, that is, the second target network device, or after the terminal device fails to connect with the first target network device, the terminal device also needs to notify the source network device that the connection with the first target network device fails, so that the source network device performs subsequent processing.

In addition, this embodiment may also provide other processing manners. When the source network device can select multiple target network devices for the terminal device, it can send information of at least one target network device included for the terminal device by sending RRC connection reconfiguration information during the handover preparation to the handover processing stage.

A handover command from the source network device to the terminal device may include multiple optional reconfiguration messages of the target network device. Here, the reconfiguration message can be an RRC connection reconfiguration message. A method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

When the terminal device successfully establishes the connection with the second target network device, first instruction information sent by the terminal device is received, or the first instruction information sent by the second target network device is received; the first indication information is used for indicating identification information of the second target network device selected from the at least one target network device.

That is, after the terminal device returns to the connection with the source network device, the source network device does not need to select the target network device again; instead, the terminal device selects the second target network device from the least one target network device included in the RRC connection reconfiguration information according to original received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

A handover processing flow can be seen in FIG. 3, including a handover preparation phase includes steps 1-6 in the figure: the source network device sends measurement control to the terminal device; the terminal device sends a measurement report to the source network device after performing the measurement for multiple network devices or cells; the source network device makes a handover decision according to the measurement report (or along with RRM information); the source network device sends a handover request to the target network device, so that the target network device is ready for the handover; the target network device performs handover admission control according to the handover request; when the target network device determines to perform the handover, it sends a handover request acknowledgement to the network device. Then the flow proceeds to a handover execution phase, which includes steps 7-11 in the figure, specifically: the target network device generates RRC information, sends the RRC information to the source network device, and the source network device sends it to the terminal device through the RRC connection reconfiguration information; after receiving the RRC connection reconfiguration information, the terminal device performs the handover processing based on the connection reconfiguration information; then the source network device sends SN status transfer to the target network device; the terminal device synchronizes with the target network device, and then receives the target network device for UL allocation, and sends the RRC connection reconfiguration completion message to the target network device. Finally, the flow proceeds to a handover completion stage, which includes steps 12-18 in the figure, specifically: the target network device sends a path switching request to the MME to notify the MME terminal device to change the cell; the MME sends a bearer adjustment request to a serving gateway, and the MME performs a downlink path switching processing; after completing the processing, the serving gateway sends bearer adjustment completion processing to the MME, and the MME sends a path switching request acknowledgement message to the target network device; the target network device notifies the source network device of the terminal device context release and the source network device releases the resource.

Before initiating the connection to the second target network device, or after the terminal device fails to connect with the first target network device, the terminal device may also notify the source network device that the connection with the first target network device fails, so that the source network device performs the subsequent processing: Of course, in this scenario, the source network device may not be notified of the connection failure, and the terminal device only needs to directly select the second target network device from the multiple target network devices.

It should be understood that the second target network device may be the same as or different from the first target network device.

It should also be noted that when the connection is reinitiated to the second target network device, the method further includes: maintaining the connection with the source network device.

That is to say, during the process of initiating the connection with the first target network device and the second target network device by the terminal device, the connection with the source network device can be maintained.

After initiating the connection to the second target network device, the method further includes: sending first indication information to the source network device if the connection with the second target network device is successfully established, and the first indication information is used for indicating identification information of the second target network device selected from the at least one target network device.

That is, through the connection with the source network device, the indication information is sent to the source network device through the connection with the source network device, so that the source network device knows the second target network device selected by the terminal device. Correspondingly, the second target network device will perform handover subsequent operations according to the connection initiated by the terminal device, for example, synchronize with the target network device, then receive the second target network device for UL allocation, and send the RRC connection reconfiguration completion information to the target network device; the second target network device sends the path switching request to the MME to notify the MME terminal device to change the cell; the MME sends the bearer adjustment request to the serving gateway, and the MME performs the downlink path switching processing; the serving gateway sends the bearer adjustment completion processing to the MME after the processing is completed, and the MME sends the path switching request acknowledgement message to the second target network device; the second target network device notifies the source network device of the terminal device context release and the source network device releases the resource. It should be understood that the foregoing is only an example of the handover processing method in the LTE scenario. In LTE, a core network element is the MME, and this embodiment is not limited to the LTE scenario and can also be applied to a New Radio (NR) scenario. And in this case, the core network element is changed from MME to AMF and UPF, but this embodiment will not exhaustively list different scenarios.

For example, if the source network device wants the terminal device to perform the handover, it triggers the terminal device to perform the measurement and sends the handover request to multiple target network devices; when the terminal device receives RRC reconfiguration messages of the multiple target network devices and selects one of them as the first target network device to perform random access; when the terminal device is to switch from the source network device to the first target network device if T304 times out or access to the target network device fails, the terminal device can select the second target network device among the remaining at least one target network device configured in the RRC connection reconfiguration information in the HO command and perform the random access to the second target network device on the basis of maintaining the connection with the source network device.

The applicable scenarios of this embodiment are the terminal maintains the connection with the source network device and fails to connect with the target network device; the terminal disconnects from the source network device and successfully connects with the target network device, and the secondary cell group (SCG) fails to connect, and the SCG fails to change the connection. Of course, there may also be that in a scenario where multiple SCGs are configured, and one SCG fails to connect, and in a scenario where multiple target cells are configured, and one target cell fails to connect. There may also be other applicable scenarios, but it is not exhaustively listed in this embodiment.

It can be seen that with the above implementations, since the terminal device maintains the connection with the source network device during the handover phase, when the terminal device fails to switch the connection with the target network device, it still returns to the connection with the source network device, and re-initiates the connection to the new target network device; in this way, the terminal device can maintain the connection with the source network device when the handover fails, thereby ensuring that the connection with the target network device can be quickly re-established.

Fourth Embodiment

An embodiment of the present disclosure provides a handover processing method, which is applied to a source network device, and the method includes disconnecting from a terminal device when the terminal device initiates a connection to a first target network device.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover between the terminal device and the target network device is performed. For example, it is executed after the terminal device has completed measurement according to control of the source network device and reported a measurement result to the source network device, and the source network device selects the target network device for the terminal device.

This embodiment is different from the third embodiment in that when the terminal device is connecting to the first target network device in this embodiment, it disconnects from the source network device.

This embodiment further includes sending a reconfiguration message containing the at least one target network device to the terminal device.

The reconfiguration message can be an RRC connection reconfiguration message. A method for obtaining the RRC connection reconfiguration information can be: when the source network device can select multiple target network devices for the terminal device, it can send information of at least one target network device included for the terminal device by sending RRC connection reconfiguration information during the handover preparation to the handover processing stage; and a method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

That is, when the terminal device fails to connect to the first target network device, the terminal device selects the second target network device from the at least one target network device contained in the RRC connection reconfiguration information according to the received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

A handover processing flow can be seen in FIG. 3, including a handover preparation phase includes steps 1-6 in the figure: the source network device sends measurement control to the terminal device; the terminal device sends a measurement report to the source network device after performing the measurement for multiple network devices or cells; the source network device makes a handover decision according to the measurement report (or along with RRM information); the source network device sends a handover request to the target network device, so that the target network device is ready for the handover; the target network device performs handover admission control according to the handover request; when the target network device determines to perform the handover, it sends a handover request acknowledgement to the network device. Then the flow proceeds to a handover execution phase, which includes steps 7-11 in the figure, specifically: the target network device generates RRC information, sends the RRC information to the source network device, and the source network device sends it to the terminal device through the RRC connection reconfiguration information; after receiving the RRC connection reconfiguration information, the terminal device performs the handover processing based on the connection reconfiguration information; then the source network device sends SN status transfer to the target network device; the terminal device synchronizes with the target network device, and then receives the target network device for UL allocation, and sends the RRC connection reconfiguration completion message to the target network device. Finally, the flow proceeds to a handover completion stage, which includes steps 12-18 in the figure, specifically: the target network device sends a path switching request to the MME to notify the MME terminal device to change the cell; the MME sends a bearer adjustment request to a serving gateway, and the MME performs a downlink path switching processing; after completing the processing, the serving gateway sends bearer adjustment completion processing to the MME, and the MME sends a path switching request acknowledgement message to the target network device; the target network device notifies the source network device of the terminal device context release and the source network device releases the resource. It should be understood that the foregoing is only an example of the handover processing method in the LTE scenario. In LTE, a core network element is the MME, and this embodiment is not limited to the LTE scenario and can also be applied to a New Radio (NR) scenario. And in this case, the core network element is changed from MME to AMF and UPF, but this embodiment will not exhaustively list different scenarios.

The applicable scenarios of this embodiment are in a scenario where multiple SCGs are configured, and one SCG fails to connect, and in a scenario where multiple target cells are configured, and one target cell fails to connect. There may also be other applicable scenarios, but it is not exhaustively listed in this embodiment. For example, in a dual-connection (DC) or multi-connection scenario, the master node (MN) selects multiple secondary nodes (SN) according to the measurement results to initiate an SN addition request or an SN modification request; at this time, the terminal device can obtain information of at least one target SN. If the addition or change of a first target SN, that is, the first target network device fails, the terminal device can change to the second target SN. That is, the second target network device to perform the random access.

It can be seen that with the above implementations, since the terminal device can reselect the second target network device from the multiple target network devices to initiate the connection when the terminal device fails to switch the connection with the first target network device in the handover phase; in this way, the terminal device can quickly re-initiate the connection when the handover fails.

Fifth Embodiment

Figure 5:
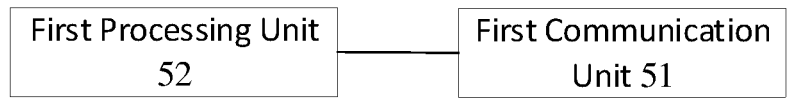
FIG. 5 is a first structural schematic diagram of a terminal device provided by an embodiment of the present disclosure.

An embodiment of the present disclosure provides a terminal device, as shown in FIG. 5, including a first communication unit 51 that initiates a connection to a first target network device, and maintains a connection with a source network device, and returns to the connection with the source network device and initiate a connection to a second target network device, when the connection with the first target network device fails.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover between the terminal device and the target network device is performed. For example, it is executed after the terminal device has completed measurement according to control of the source network device and reported a measurement result to the source network device, and the source network device selects the target network device for the terminal device.

In the solution provided in this embodiment, when the terminal device initiates the connection request to the first target network device, it also maintains the connection with the source network device at the same time. The terminal device further includes a first processing unit 52 that retains a first protocol stack and a first related key with the source network device and performs maintenance on a second protocol stack and a second related key with the first target network device. The first related key is different from the second related key. The second related key may be generated by the first related key.

The first protocol stack and the second protocol stack may be the same or different, or at least partly different. For example, for a 5G system, it may be that different service data application protocols (SDAP), different packet data convergence protocols (PDCP), different radio link layer control (RLC) protocols, different media access control (MAC) entities, and different low layer entities are maintained between the terminal device and the source network device, and between the terminal device and the first target network device; for a 4G systems, it may be that different packet data convergence protocols (PDCP), different radio link layer control (RLC) protocols, different media access control (MAC) entities, and different low layer entities are maintained between the terminal device and the source network device, and between the terminal device and the first target network device.

In this embodiment, after the terminal device fails to connect with the first target network device, a process of re-establishing a connection with the second target network device may be performed, which specifically may be re-initiating a connection to the second target network device based on a new target network device selected by the source network device.

A process of re-establishing the connection with the new target network device may be a first processing unit 52 re-initiates a connection to the second target network device based on the new target network device selected by the source network device.

At this time, the source network device re-initiates a handover preparation process, such as triggering the terminal device to perform the measurement, and the source network device requests to switch to the second target network device for the terminal device according to the measurement report. That is, the source network device can re-select the second target network device for the terminal device; the measurement report can be re-triggered by the source base station to cause the terminal to perform handover measurement and report the measurement result, etc., or a second target base station may be selected based on the measurement report previously reported by the terminal device.

Before initiating the connection to the second target network device, or after the terminal device fails to connect with the first target network device, the first processing unit 52 sends second indication information to the source network device, and the second indication information is used for notifying that the connection with the first target network device fails.

In other words, before re-initiating the connection to a new target network device, that is, the second target network device, or after the terminal device fails to connect with the first target network device, the terminal device also needs to notify the source network device that the connection with the first target network device fails, so that the source network device performs subsequent processing.

In addition, this embodiment may also provide other processing manners. When the source network device can select multiple target network devices for the terminal device, it can send information of at least one target network device included for the terminal device by sending RRC connection reconfiguration information during the handover preparation to the handover processing stage.

A handover command from the source network device to the terminal device may include multiple optional reconfiguration messages of the target network device. Here, the reconfiguration message can be an RRC connection reconfiguration message. A method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

A process of re-establishing the connection with the new target network device may be the first processing unit 52 selects the second target network device from at least one target network device and re-initiates the connection to the second target network device through the first communication unit 51.

That is to say, after the terminal device returns to the connection with the source network device, the source network device does not need to select the target network device again; instead, the terminal device selects the second target network device from the least one target network device included in the RRC connection reconfiguration information according to original received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

It should be understood that the second target network device may be the same as or different from the first target network device.

It should also be pointed out that when the connection is reinitiated to the second target network device, the first communication unit 51 maintains the connection with the source network device.

That is to say, during the process of initiating the connection with the first target network device and the second target network device by the terminal device, the connection with the source network device can be maintained.

After initiating the connection to the second target network device, the first communication unit 51 sends first indication information to the source network device if the connection with the second target network device is successfully established, and the first indication information is used for indicating identification information of the second target network device selected from the at least one target network device.

That is, through the connection with the source network device, the indication information is sent to the source network device through the connection with the source network device, so that the source network device knows the second target network device selected by the terminal device. Correspondingly, the second target network device will perform handover subsequent operations according to the connection initiated by the terminal device, for example, synchronize with the target network device, then receive the second target network device for UL allocation, and send the RRC connection reconfiguration completion information to the target network device; the second target network device sends the path switching request to the MME to notify the MME terminal device to change the cell; the MME sends the bearer adjustment request to the serving gateway, and the MME performs the downlink path switching processing; the serving gateway sends the bearer adjustment completion processing to the MME after the processing is completed, and the MME sends the path switching request acknowledgement message to the second target network device; the second target network device notifies the source network device of the terminal device context release and the source network device releases the resource.

It should be understood that the foregoing is only an example of the handover processing method in the LTE scenario. In LTE, a core network element is the MME, and this embodiment is not limited to the LTE scenario and can also be applied to a New Radio (NR) scenario. And in this case, the core network element is changed from MME to AMF and UPF, but this embodiment will not exhaustively list different scenarios.

The applicable scenarios of this embodiment are the terminal maintains the connection with the source network device and fails to connect with the target network device; the terminal disconnects from the source network device and successfully connects with the target network device, and the secondary cell group (SCG) fails to connect, and the SCG fails to change the connection. Of course, there may also be that in a scenario where multiple SCGs are configured, and one SCG fails to connect, and in a scenario where multiple target cells are configured, and one target cell fails to connect. There may also be other applicable scenarios, but it is not exhaustively listed in this embodiment.

It can be seen that with the above implementations, since the terminal device maintains the connection with the source network device during the handover phase, when the terminal device fails to switch the connection with the target network device, it still returns to the connection with the source network device; in this way, the terminal device can maintain the connection with the source network device when the handover fails, thereby ensuring that the connection with the target network device can be quickly re-established.

Sixth Embodiment

Figure 6:
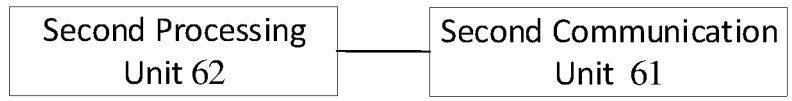
FIG. 6 is a second structural schematic diagram of components of a terminal device provided by an embodiment of the present disclosure.

An embodiment of the present disclosure provides a terminal device, and as shown in FIG. 6, the terminal device includes a second communication unit 61 that initiates a connection to a first target network device; and a second processing unit 62 that selects a second target network device from at least one target network device and initiates a connection to the second target network device through the second communication unit, when the connection with the first target network device fails.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover between the terminal device and the target network device is performed. For example, it is executed after the terminal device has completed measurement according to control of the source network device and reported a measurement result to the source network device, and the source network device selects the target network device for the terminal device.

This embodiment is different from the first embodiment in that when the terminal device is connecting to the first target network device in this embodiment, it disconnects from the source network device.

This embodiment further includes a second communication unit 61 that receives a reconfiguration message containing the at least one target network device sent by the source network device.

The reconfiguration message can be an RRC connection reconfiguration message. A method for obtaining the RRC connection reconfiguration information can be: when the source network device can select multiple target network devices for the terminal device, it can send information of at least one target network device included for the terminal device by sending RRC connection reconfiguration information during the handover preparation to the handover processing stage; and a method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

That is, when the terminal device fails to connect to the first target network device, the terminal device selects the second target network device from the at least one target network device contained in the RRC connection reconfiguration information according to the received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

The second target network device may perform the handover subsequent operations according to the connection initiated by the terminal device, for example, synchronize with the target network device, then receive the second target network device for UL allocation, and send the RRC connection reconfiguration completion information to the target network device; the second target network device sends the path switching request to the MME to notify the MME terminal device to change the cell; the MME sends the bearer adjustment request to the serving gateway, and the MME performs the downlink path switching processing; the serving gateway sends the bearer adjustment completion processing to the MME after the processing is completed, and the MME sends the path switching request acknowledgement message to the second target network device; the second target network device notifies the source network device of the terminal device context release and the source network device releases the resource.

It should be understood that the foregoing is only an example of the handover processing method in the LTE scenario. In LTE, a core network element is the MME, and this embodiment is not limited to the LTE scenario and can also be applied to a New Radio (NR) scenario. And in this case, the core network element is changed from MME to AMF and UPF, but this embodiment will not exhaustively list different scenarios.

The first target network device and the second target network device are target network devices when the terminal device performs the handover, or the first target network device and the second target network device are secondary nodes SNs, and the source network device is the master node MN.

The applicable scenarios of this embodiment are in a scenario where multiple SCGs are configured, and one SCG fails to connect, and in a scenario where multiple target cells are configured, and one target cell fails to connect. There may also be other applicable scenarios, but it is not exhaustively listed in this embodiment.

For example, in a dual-connection (DC) or multi-connection scenario, the master node (MN) selects multiple secondary nodes (SN) according to the measurement results to initiate an SN addition request or an SN modification request; at this time, the terminal device can obtain information of at least one target SN. If the addition or change of a first target SN, that is, the first target network device fails, the terminal device can change to the second target SN, that is, the second target network device to perform the random access.

It can be seen that with the above implementations, since the terminal device can reselect the second target network device from the multiple target network devices to initiate the connection when the terminal device fails to switch the connection with the first target network device in the handover phase; in this way, the terminal device can quickly re-initiate the connection when the handover fails.

Seventh Embodiment

Figure 7:
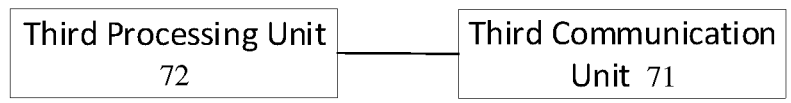
FIG. 7 is a structural schematic diagram of components of a source network device provided by an embodiment of the present disclosure.

An embodiment of the present disclosure provides a source network device, and as shown in FIG. 7, the source network device includes a third communication unit 71 that maintains a connection with a terminal device when the terminal device initiates a connection to a first target network device, and maintains the connection with the terminal device when the terminal device fails to connect with the first target network device, wherein the terminal device is a terminal device located in a coverage area of the source network device.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover between the terminal device and the target network device is performed. For example, it is executed after the terminal device has completed measurement according to control of the source network device and reported a measurement result to the source network device, and the source network device selects the target network device for the terminal device.

In the solution provided in this embodiment, when the terminal device initiates the connection request to the first target network device, it also maintains the connection with the source network device at the same time. Specifically, the source network device further includes a third processing unit 72, the terminal device retains a first protocol stack and a first related key with the source network device and performs maintenance on a second protocol stack and a second related key with the first target network device. The first related key is different from the second related key. The second related key may be generated by the first related key.

The first protocol stack and the second protocol stack may be the same or different, or at least partly different. For example, for a 5G system, it may be that different service data application protocols (SDAP), different packet data convergence protocols (PDCP), different radio link layer control (RLC) protocols, different media access control (MAC) entities, and different low layer entities are maintained between the terminal device and the source network device, and between the terminal device and the first target network device; for a 4G systems, it may be that different packet data convergence protocols (PDCP), different radio link layer control (RLC) protocols, different media access control (MAC) entities, and different low layer entities are maintained between the terminal device and the source network device, and between the terminal device and the first target network device.

In this embodiment, after the terminal device fails to connect with the first target network device, a process of re-establishing a connection with the second target network device may be performed.

A process of re-establishing a connection with the new target network device may be the third communication unit 71 re-initiates the connection to the second target network device based on the new target network device selected by the source network device.

At this time, the source network device re-initiates a handover preparation process, such as triggering the terminal device to perform the measurement, and the source network device requests to switch to the second target network device for the terminal device according to the measurement report. That is, the source network device can re-select the second target network device for the terminal device; the measurement report can be re-triggered by the source base station to cause the terminal to perform handover measurement and report the measurement result, etc., or a second target base station may be selected based on the measurement report previously reported by the terminal device.

In this embodiment, the method for selecting the second target network device of the terminal device by the third communication unit 71 may also include one of the following: selecting the second target network device based on the measurement report corresponding to the at least one target network device; and randomly selecting the second target network device from the at least one target network device.

The source network device can directly obtain the measurement report of at least one target network device of the terminal device when the terminal device initiates the handover process of the first target network device. When the terminal device needs to initiate the connection again, the source network device can directly select the second target network device from the at least one target network device in the originally obtained measurement report, and indicate the second target network device to the terminal device, so that the terminal device can initiate the connection request to the second target network device; or, when the terminal device needs to initiate the connection to the second target network device, the network side directly selects the second target network device randomly from at least one target network device and initiates it to the terminal device.

Before maintaining the connection with the terminal device when the terminal device initiates the connection to the second target network device, or after the terminal device fails to connect with the first target network device, the third communication unit 71 receives second indication information sent by the terminal device, wherein the second indication information is used for notifying that the terminal device fails to connect with the first target network device.

In other words, before re-initiating the connection to a new target network device, that is, the second target network device, the terminal device also needs to notify the source network device that the connection with the first target network device fails, so that the source network device performs subsequent processing.

In addition, this embodiment may also provide other processing manners. When the source network device can select multiple target network devices for the terminal device, it can send information of at least one target network device included for the terminal device by sending RRC connection reconfiguration information during the handover preparation to the handover processing stage.

A handover command from the source network device to the terminal device may include multiple optional reconfiguration messages of the target network device. Here, the reconfiguration message can be an RRC connection reconfiguration message. A method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

When the terminal device successfully establishes the connection with the second target network device, first instruction information sent by the terminal device is received, or the first instruction information sent by the second target network device is received; the first indication information is used for indicating identification information of the second target network device selected from the at least one target network device.

That is, after the terminal device returns to the connection with the source network device, the source network device does not need to select the target network device again; instead, the terminal device selects the second target network device from the least one target network device included in the RRC connection reconfiguration information according to original received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

Before the terminal device initiates the connection to the second target network device, or after the terminal device fails to connect to the first target network device, the third communication unit 71 may also receive second indication information sent by the terminal device, and the second indication information is used for notifying that the terminal device fails to connect with the first target network device.

In other words, before re-initiating the connection to a new target network device, that is, the second target network device, the terminal device also needs to notify the source network device that the connection with the first target network device fails, so that the source network device performs subsequent processing.

It should be understood that the second target network device may be the same as or different from the first target network device.

It should also be noted that when the connection is reinitiated to the second target network device, the method further includes: maintaining the connection with the source network device.

That is to say, during the process of initiating the connection with the first target network device and the second target network device by the terminal device, the connection with the source network device can be maintained.

After initiating the connection to the second target network device, the third communication unit 81 sends first indication information to the source network device if the connection with the second target network device is successfully established, and the first indication information is used for indicating identification information of the second target network device selected from the at least one target network device.

That is, through the connection with the source network device, the indication information is sent to the source network device through the connection with the source network device, so that the source network device knows the second target network device selected by the terminal device. Correspondingly, the second target network device will perform handover subsequent operations according to the connection initiated by the terminal device, for example, synchronize with the target network device, then receive the second target network device for UL allocation, and send the RRC connection reconfiguration completion information to the target network device; the second target network device sends the path switching request to the MME to notify the MME terminal device to change the cell; the MME sends the bearer adjustment request to the serving gateway, and the MME performs the downlink path switching processing; the serving gateway sends the bearer adjustment completion processing to the MME after the processing is completed, and the MME sends the path switching request acknowledgement message to the second target network device; the second target network device notifies the source network device of the terminal device context release and the source network device releases the resource.

It should be understood that the foregoing is only an example of the handover processing method in the LTE scenario. In LTE, a core network element is the MME, and this embodiment is not limited to the LTE scenario and can also be applied to a New Radio (NR) scenario. And in this case, the core network element is changed from MME to AMF and UPF, but this embodiment will not exhaustively list different scenarios.

For example, if the source network device wants the terminal device to perform the handover, it triggers the terminal device to perform the measurement and sends the handover request to multiple target network devices; when the terminal device receives RRC reconfiguration messages of the multiple target network devices and selects one of them as the first target network device to perform random access; when the terminal device is to switch from the source network device to the first target network device, if T304 times out or access to the target network device fails, the terminal device can select the second target network device among the remaining at least one target network device configured in the RRC connection reconfiguration information in the HO command and perform the random access to the second target network device on the basis of maintaining the connection with the source network device.

The applicable scenarios of this embodiment are the terminal maintains the connection with the source network device and fails to connect with the target network device; the terminal disconnects from the source network device and successfully connects with the target network device, and the secondary cell group (SCG) fails to connect, and the SCG fails to change the connection. Of course, there may also be that in a scenario where multiple SCGs are configured, and one SCG fails to connect, and in a scenario where multiple target cells are configured, and one target cell fails to connect. There may also be other applicable scenarios, but it is not exhaustively listed in this embodiment.

It can be seen that with the above implementations, since the terminal device maintains the connection with the source network device during the handover phase, when the terminal device fails to switch the connection with the target network device, it still returns to the connection with the source network device, and re-initiates the connection to the new target network device; in this way, the terminal device can maintain the connection with the source network device when the handover fails, thereby ensuring that the connection with the target network device can be quickly re-established.

Eight Embodiment

An embodiment of the present disclosure provides a source network device, including a fourth communication unit that disconnects from a terminal device when the terminal device initiates the connection to the first target network device.

Here, failure in connection with the first target network device includes one of the following: a random access failure, handover timeout, and SCG reconfiguration timeout.

Specifically, reasons for a failure in handover between the terminal device and the first target network device mainly include the following: T304 timeout, T307 timeout, and T312 timeout.

T304 is handover timeout; T307 is used for indicating secondary cell group (SCG) reconfiguration timeout. Timers of T304 and T307 both are enabled when the terminal device receives an RRC reconfiguration message, and the reconfiguration message contains mobility control information, and if the timer expires, a link connection is considered to be failed.

T312 indicates that the random access fails, that is, random access timeout; the timer thereof is enabled when triggered by a measurement report. If the timer expires, the terminal device returns to an idle state or initiates a connection re-establishment process.

In addition, the processing of the initiating the connection to the first target network device by the terminal device may occur in a stage during which the handover between the terminal device and the target network device is performed. For example, it is executed after the terminal device has completed measurement according to control of the source network device and reported a measurement result to the source network device, and the source network device selects the target network device for the terminal device.

This embodiment is different from the third embodiment in that when the terminal device is connecting to the first target network device in this embodiment, it disconnects from the source network device.

This embodiment further includes a fourth communication unit that sends a reconfiguration message containing the at least one target network device to the terminal device.

The reconfiguration message can be an RRC connection reconfiguration message. A method for obtaining the RRC connection reconfiguration information can be: when the source network device can select multiple target network devices for the terminal device, it can send information of at least one target network device included for the terminal device by sending RRC connection reconfiguration information during the handover preparation to the handover processing stage; and a method for sending the RRC connection reconfiguration information can be seen in the description of FIG. 3. For example, it can trigger the terminal device to perform the measurement and send a request to the target network device when the handover is required, and only when the target network device agrees, the source network device sends the RRC connection reconfiguration information to the terminal device.

That is, when the terminal device fails to connect to the first target network device, the terminal device selects the second target network device from the at least one target network device contained in the RRC connection reconfiguration information according to the received RRC connection reconfiguration information and then initiates the connection to the second target network device.

It should be understood that the RRC connection reconfiguration information may also include mobility control information, a new C-RNTI, and security information of the second target network device; in addition, it may optionally also include information such as a random access preamble, a system information block (SIB) of the second target network device.

The applicable scenarios of this embodiment are in a scenario where multiple SCGs are configured, and one SCG fails to connect, and in a scenario where multiple target cells are configured, and one target cell fails to connect. There may also be other applicable scenarios, but it is not exhaustively listed in this embodiment. For example, in a dual-connection (DC) or multi-connection scenario, the master node (MN) selects multiple secondary nodes (SN) according to the measurement results to initiate an SN addition request or a SN modification request; at this time, the terminal device can obtain information of at least one target SN. If the addition or change of a first target SN, that is, the first target network device fails, the terminal device can change to the second target SN, that is, the second target network device to perform the random access.

It can be seen that with the above implementations, since the terminal device can reselect the second target network device from the multiple target network devices to initiate the connection when the terminal device fails to switch the connection with the first target network device in the handover phase; in this way, the terminal device can quickly re-initiate the connection when the handover fails.

Figure 8:
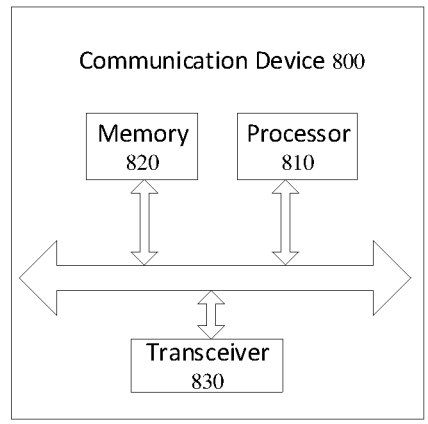
FIG. 8 is a structural schematic diagram of components of a communication device provided by an embodiment of the present disclosure.

FIG. 8 is a schematic structural diagram of a communication device 800 provided by an embodiment of the present disclosure. In this embodiment, the communication device may be the terminal device or the network device. The communication device 800 shown in FIG. 8 includes a processor 810. The processor 810 may invoke a computer program from a memory and run the computer program, to implement the method in the embodiments of the present disclosure.

Optionally, as shown in FIG. 8, the communication device 800 may further include a memory 820. The processor 810 may invoke the computer program from the memory 820 and run the computer program, to implement the method in the embodiments of the present disclosure.

The memory 820 may be a component independent of the processor 810 or may be integrated into the processor 810.

Optionally, as shown in FIG. 8, the communication device 800 may further include a transceiver 830. The processor 810 may control the transceiver 830 to communicate with another device, and specifically, the transceiver 830 may transmit information or data to another device, or receive information or data transmitted by another device.

The transceiver 830 may include a transmitter and a receiver. The transceiver 830 may further include an antenna. There may be one or more antennas.

Optionally, the communication device 800 may be the network device in the embodiments of the present disclosure, and the communication device 800 can implement corresponding procedures implemented by the network device in various methods in the embodiments of the present disclosure. For brevity, details are not described herein again.

Optionally, the communication device 800 may be the terminal device or the network device in the embodiments of the present disclosure, and the communication device 800 can implement corresponding procedures implemented by the mobile terminal/terminal device in various methods in the embodiments of the present disclosure. For brevity, details are not described herein again.

Figure 9:
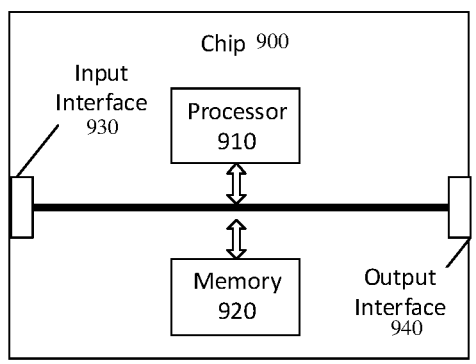
FIG. 9 is a schematic block diagram of a chip provided by an embodiment of the present disclosure.

FIG. 9 is a schematic structural diagram of a chip according to an embodiment of the present disclosure. The chip 900 shown in FIG. 9 includes a processor 910. The processor 910 may invoke a computer program from a memory and run the computer program, to implement the method in the embodiments of the present disclosure.

Optionally, as shown in FIG. 9, the chip 900 may further include a memory 920. The processor 910 may invoke the computer program from the memory 920 and run the computer program, to implement the method in the embodiments of the present disclosure.

The memory 920 may be a component independent of the processor 910, or may be integrated into the processor 910.

Optionally, the chip 900 may further include an input interface 930. The processor 910 may control the input interface 930 to communicate with another device or chip, and specifically, the input interface 930 may obtain information or data transmitted by another device or chip.

Optionally, the chip 900 may further include an output interface 940. The processor 910 may control the output interface 940 to communicate with another device or chip, and specifically, the output interface 940 may output information or data to another device or chip.

Optionally, the chip may be applied in the network device according to embodiments of the present disclosure, and the chip can implement corresponding procedures implemented by the network device in various methods in the embodiments of the present disclosure. For brevity, details are not described herein again.

Optionally, the chip may be applied to the terminal device in the embodiments of the present disclosure, and the chip can implement corresponding procedures implemented by the terminal device in various methods in the embodiments of the present disclosure. For brevity, details are not described herein again.

It should be noted that the chip mentioned in the embodiments of the present disclosure may also be referred to as a system-level chip, a system chip, a chip system, a system on chip, or the like.

Figure 10:
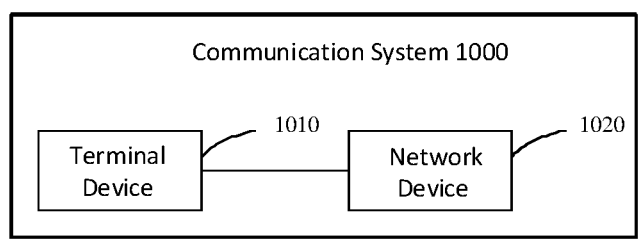
FIG. 10 is a second schematic diagram of a communication system architecture provided by an embodiment of the present disclosure.

FIG. 10 is a schematic structural diagram of a communication system 1000 according to an embodiment of the present disclosure. The communication system 1000 shown in FIG. 10 includes a terminal device 1010 and a network device 1020.

The terminal device 1010 can implement corresponding functions implemented by the terminal device in the foregoing method and the network device 1020 can implement corresponding functions implemented by the network device in the foregoing method. For brevity, details are not described herein again.

It should be understood that the processor of the embodiments of the present disclosure may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). It should be noted that, the memory of the system and the method described in this embodiment of the present disclosure is intended to include but is not limited to these memories and any other suitable type of memory.

It should be understood that the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present disclosure is intended to include but is not limited to these memories and any other suitable type of memory.

An embodiment of the present disclosure further provides a computer-readable storage medium. The computer-readable storage medium is configured to store a computer program.

Optionally, the computer-readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer-readable storage medium may be applied to the terminal device in the embodiments of the present disclosure, and the computer program enables the computer to execute a corresponding procedure implemented by the mobile terminal/terminal device in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details are not described herein again.

Optionally, the computer program product may be applied to the mobile terminal/terminal device in the embodiments of the present disclosure, and the computer program instruction enables the computer to execute a corresponding procedure implemented by the mobile terminal/terminal device in the methods of the embodiments of the present disclosure. For brevity, details are not described herein again.

The present disclosure further provides a computer program.

Optionally, the computer program may be applied to the network device in the embodiments of the present disclosure, and when run on a computer, the computer program instruction enables the computer to execute a corresponding procedure implemented by the network device in the methods of the embodiments of the present disclosure. For brevity, details are not described herein again.

Optionally, the computer program may be applied to the mobile terminal/terminal device in the embodiments of the present disclosure, and when run on a computer, the computer program instruction enables the computer to execute a corresponding procedure implemented by the mobile terminal/terminal device in the methods of the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to the corresponding process in the foregoing method embodiments, and details are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for handover processing by a terminal device, the method comprising:

initiating a connection to a first target network device based on a first protocol stack and a first related key;

maintaining a connection with a source network device that has selected and sent a connection request to the first target network device for the connection of the terminal device with the first target network device; and when the connection with the first target network device fails, returning to the connection with the source network device based on a second protocol stack and a second related key retained in the terminal device and initiating a connection to a second target network device, the second related key being different from the first related key.

2. The method according to claim 1, wherein when initiating the connection to the first target network device, and maintaining the connection with the source network device, the method further comprises:

retaining the second protocol stack and the second related key with the source network device, and performing maintenance on the first protocol stack and the first related key with the first target network device.

3. The method according to claim 2, wherein a failure in the connection with the first target network device comprises at least one of the following:

a random access failure;

handover timeout; and secondary cell group (SCG) reconfiguration timeout.

4. The method according to claim 1, wherein the initiating the connection to the second target network device comprises:

selecting the second target network device from at least one target network device; and initiating the connection to the second target network device.

5. The method according to claim 4, wherein after initiating the connection to the second target network device, the method further comprises:

sending first indication information to the source network device if the connection with the second target network device is successfully established, wherein the first indication information is used for indicating identification information of the second target network device selected from the at least one target network device.

6. The method according to claim 5, wherein after sending the first indication information to the source network device, the method further comprises: disconnecting from the source network device.

7. The method according to claim 1, wherein when initiating the connection to the second target network device, the method further comprises:

maintaining the connection with the source network device.

8. The method according to claim 7, wherein before initiating the connection to the second target network device, the method further comprises:

sending second indication information to the source network device, wherein the second indication information is used for notifying that the connection with the first target network device fails.

9. A method for handover processing by a source network device, the method comprising:

maintaining a connection with a terminal device when the terminal device initiates a connection to a first target network device based on a first protocol stack and a first related key, wherein the source network device has selected and sent a connection request to the first target network device for the connection of the terminal device with the first target network device; and maintaining the connection with the terminal device based on a second protocol stack and a second related key retained in the terminal device when the terminal device fails to connect with the first target network device and initiates a connection to a second target network device, the second related key being different from the first related key, wherein the terminal device is a terminal device located in a coverage area of the source network device.

10. The method according to claim 9, wherein when maintaining the connection with the terminal device when the terminal device initiates the connection to the first target network device, the method further comprises:

retaining the second protocol stack and the second related key with the terminal device.

11. The method according to claim 10, wherein the method further comprises one of the following:

selecting the second target network device based on a measurement report corresponding to at least one target network device; and randomly selecting the second target network device from the at least one target network device.

12. The method according to claim 9, further comprising:

receiving first indication information sent by the terminal device or receiving first indication information sent by the second target network device when the terminal device successfully establishes a connection with the second target network device, wherein the first indication information is used for indicating identification information of the second target network device selected from at least one target network device.

13. The method according to claim 12, wherein after receiving the first indication information sent by the terminal device, the method further comprises:

sending a reconfiguration message containing the at least one target network device to the terminal device; and disconnecting from the terminal device.

14. The method according to claim 9, wherein the method further comprises:

receiving second indication information sent by the terminal device, wherein the second indication information is used for notifying that the terminal device fails to connect with the first target network device.

15. A terminal device, comprising: a processor and a memory for storing a computer program executable on the processor, wherein when the computer program is executed on the processor, the execution causes the terminal device to:

initiate a connection to a first target network device based on a first protocol stack and a first related key;

maintain a connection with a source network device that has selected and sent a connection request to the first target network device for the connection of the terminal device with the first target network device; and when the connection with the first target network device fails, return to the connection with the source network device based on a second protocol stack and a second related key retained in the terminal device and initiate a connection to a second target network device, the second related key being different from the first related key.

16. The terminal device according to claim 15, wherein the terminal device is further caused to:

retain the second protocol stack and the second related key with the source network device, and perform maintenance on the first protocol stack and the first related key with the first target network device.

17. The terminal device according to claim 16, wherein a failure in the connection with the first target network device comprises one of the following:

a random access failure;

handover timeout; and secondary cell group (SCG) reconfiguration timeout.

18. The terminal device according to claim 15, wherein the terminal device is further caused to:

select the second target network device from at least one target network device;

initiate the connection to the second target network device through a first communication unit;

send first indication information to the source network device through the first communication unit, if the connection with the second target network device is successfully established, wherein the first indication information is used for indicating identification information of the second target network device selected from the at least one target network device; and disconnect from the source network device after sending the first indication information to the source network device.

19. The terminal device according to claim 15, wherein the terminal device is further caused to:

send second indication information to the source network device before initiating the connection to the second target network device, wherein the second indication information is used for notifying that the connection with the first target network device fails; and maintain the connection with the source network device when initiating the connection to the second target network device.

20. A source network device, comprising: a processor and a memory for storing a computer program executable on the processor, wherein when the computer program is executed on the processor, the execution causes the source network device to:

maintain a connection with a terminal device when the terminal device initiates a connection to a first target network device based on a first protocol stack and a first related key, wherein the source network device has selected and sent a connection request to the first target network device for the connection of the terminal device with the first target network device; and maintain the connection with the terminal device based on a second protocol stack and a second related key retained in the terminal device when the terminal device fails to connect with the first target network device and initiates a connection to a second target network device, the second related key being different from the first related key, wherein the terminal device is a terminal device located in a coverage area of the source network device.

* * * * *